(12) United States Patent
Ghannam et al.

(10) Patent No.: US 11,618,395 B2
(45) Date of Patent: Apr. 4, 2023

(54) VEHICLE DATA VERIFICATION

(71) Applicant: Ford Global Technologies, LLC, Dearborn, MI (US)

(72) Inventors: Mahmoud Yousef Ghannam, Canton, MI (US); Pramita Mitra, West Bloomfield, MI (US); Brian Bennie, Sterling Heights, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 606 days.

(21) Appl. No.: 16/573,959

(22) Filed: Sep. 17, 2019

(65) Prior Publication Data

US 2021/0078512 A1 Mar. 18, 2021

(51) Int. Cl.
*B60R 16/023* (2006.01)
*H04L 67/12* (2022.01)
*H04L 9/40* (2022.01)
*H04L 9/00* (2022.01)

(52) U.S. Cl.
CPC ...... *B60R 16/0231* (2013.01); *H04L 63/0428* (2013.01); *H04L 63/12* (2013.01); *H04L 63/126* (2013.01); *H04L 67/12* (2013.01); *H04L 9/50* (2022.05)

(58) Field of Classification Search
CPC . B60R 16/0231; H04L 63/0428; H04L 63/12; H04L 63/126; H04L 67/12
See application file for complete search history.

(56) References Cited

U.S. PATENT DOCUMENTS

| | | | |
|---|---|---|---|
| 2009/0271804 A1* | 10/2009 | Nagano | G05B 19/0426 719/318 |
| 2014/0040992 A1* | 2/2014 | Koide | H04L 63/0442 726/4 |
| 2018/0091596 A1 | 3/2018 | Alvarez et al. | |

(Continued)

FOREIGN PATENT DOCUMENTS

| | | |
|---|---|---|
| CN | 108734592 A | 11/2018 |
| GB | 2562054 A | 11/2018 |

OTHER PUBLICATIONS

Md Swawibe Ul Alam, "Securing Vehicle Electronic Control Unit (ECU) Communications and Stored Data", A thesis submitted to the School of Computing in conformity with the requirements for the degree of Master of Science, Queen's University Kingston, Ontario, Canada Sep. 2018, Copyright Md Swawibe Ul Alam, 2018.

(Continued)

*Primary Examiner* — Jeong S Park
(74) *Attorney, Agent, or Firm* — Brandon Hicks; Bejin Bieneman PLC (57) ABSTRACT

A method includes storing a detected event code in a first blockchain, wherein each electronic control unit (ECU) in a plurality of ECUs in a vehicle includes a first blockchain node of the first blockchain; determining a validity of each first blockchain node of the first blockchain by determining that the event code is one of (a) stored in the respective first blockchain node of the first blockchain and valid or (b) not stored in the respective first blockchain node of the first blockchain and invalid; and providing the event code and the validity of each first blockchain node of the first blockchain to a second blockchain maintained at least one second blockchain node via a network outside the vehicle.

18 Claims, 6 Drawing Sheets

(56) References Cited

U.S. PATENT DOCUMENTS

| | | | |
|---|---|---|---|
| 2018/0211524 A1* | 7/2018 | Furuichi | G08G 1/162 |
| 2019/0042726 A1* | 2/2019 | Unagami | G07C 5/008 |
| 2019/0299927 A1* | 10/2019 | Ando | H04L 9/3239 |
| 2020/0081699 A1* | 3/2020 | Majed | G06F 8/65 |
| 2020/0226853 A1* | 7/2020 | Ahmed | H04L 9/0618 |
| 2020/0296559 A1* | 9/2020 | Ahmed | H04L 9/3239 |
| 2021/0084015 A1* | 3/2021 | Benson | H04L 63/0428 |

OTHER PUBLICATIONS

Cebe et al., "Block4Forensic: An Integrated Lightweight Blockchain Framework for Forensics Applications of Connected Vehicles", arXiv:1802.00561v2 [cs.CR] Jul. 9, 2018.

* cited by examiner

VEHICLE DATA VERIFICATION

BACKGROUND

A vehicle may include a plurality of electronic control units. Each electronic control unit may receive a variety of data including vehicle operation data, user control inputs, data from sensors, etc. Digital data collected and/or stored in an electronic control unit can be lost or altered, for example, during maintenance or replacement of the electronic control unit.

DETAILED DESCRIPTION

A method includes storing a detected event code in a first blockchain, wherein each electronic control unit (ECU) in a plurality of ECUs in a vehicle includes a first blockchain node of the first blockchain. The method further includes determining a validity of each first blockchain node of the first blockchain by determining that the event code is one of (a) stored in the respective first blockchain node of the first blockchain and valid or (b) not stored in the respective first blockchain node of the first blockchain and invalid, and providing the event code and the validity of each first blockchain node of the first blockchain to a second blockchain maintained in at least one second blockchain node via a network outside the vehicle.

Determining the validity of each first blockchain node of the first blockchain may be performed upon determining that the detected event code identifies damage to the vehicle.

The method may include identifying an unauthorized ECU in the plurality of ECUs based on the respective first blockchain node being invalid.

The method may include providing data identifying the unauthorized ECU to the second blockchain.

The method may include, upon receiving an update code from at least one second blockchain node via the network, storing the update code in the first blockchain. The update code may specify a number of authorized ECU modifications.

The method may include authenticating the second blockchain node based on an identifier matching an authorized identifier.

The method may include validating the update code by at least one ECU decrypting the update code with a digital key.

The method may include determining the detected event code based on sensor data of the vehicle.

Each event code may be associated in the first blockchain with one and only one of the ECUs.

The method may include determining the detected event code based on sensor data of the vehicle.

The method may include, upon detecting the event code, validating the event code by at least one ECU decrypting the event code with a digital key.

A system includes a plurality of electronic control units (ECUs) in a vehicle, each ECU having a processor and a memory, the memory of each ECU storing instructions executable by the processor of each ECU such that each processor is programmed to store a detected event code in a first blockchain, wherein each of the ECUs in the plurality of ECUs includes a first blockchain node of the first blockchain. The instructions further include instructions to determine a validity of each first blockchain node of the first blockchain by determining that the event code is one of (a) stored in the respective first blockchain node of the first blockchain and valid or (b) not stored in the respective first blockchain node of the first blockchain and invalid, and provide the event code and the validity of each first blockchain node of the first blockchain to a second blockchain maintained in at least one second blockchain node via a network outside the vehicle.

Determining the validity each first blockchain node of the first blockchain may be performed upon determining that the detected event code identifies damage to the vehicle.

The instructions may further include instructions to identify an unauthorized ECU in the plurality of ECUs based on the respective first blockchain node being invalid.

The instructions may further include instructions to provide data identifying the unauthorized ECU to the second blockchain.

The instructions may further include instructions to, upon receiving an update code from at least one second blockchain node via the network, store the update code in the first blockchain, the update code specifying a number of authorized ECU modifications.

The instructions may further include instructions to authenticate the second blockchain node based on an identifier matching an authorized identifier.

The instructions may further include instructions to validate the update code by at least one ECU decrypting the update code with a digital key.

The instructions may further include instructions to determine the detected event code based on sensor data of the vehicle.

Each event code may be associated in the first blockchain with one and only one of the ECUs.

The instructions may further include instructions to, upon detecting the event code, validate the event code by at least one ECU decrypting the event code with a digital key.

Further disclosed herein is a computing device programmed to execute any of the above method steps. Yet further disclosed herein is a computer program product, including a computer readable medium storing instructions executable by a computer processor, to execute an of the above method steps.

A vehicle 105 includes a first blockchain network 111 formed of a plurality of first blockchain nodes 127 that maintain a first electronic ledger, e.g., blockchain 201, for recording event data (as described below), sensor data, and update data (as described below). A system 100 includes a second blockchain network 112 formed of a plurality of second blockchain nodes 145 that maintains a second blockchain 202 for recording vehicle event and/or update data. A plurality of computing devices 140 store the respective second blockchain nodes 145.

Each of the first blockchain nodes 127 is included in one of a plurality of onboard computing devices, which are communicatively coupled via a network, typically various vehicle 105 electronic control units (ECUs) 126 or the like on a vehicle communications bus or network 130. As non-limiting examples, the network may be a peer-to-peer network or a peer-to-peer network with a supervisory node. The nodes 127 authorized to participate in the first blockchain network 111 are listed in the first blockchain 201.

In this disclosure, the term "network" in the context of a blockchain network 111, 112 means a network formed by blockchain nodes, i.e., a blockchain network 111, 112 means the nodes 127, 145 that form the blockchain, including links to each other nodes 127, 145. On the other hand, a "network" in the context of devices communicating with each other, e.g., ECUs 126 and/or devices 140 communicating via a vehicle network 130 and/or wide area network 135, means a physical network comprising conventional networking hardware, protocols, etc.

The plurality of second blockchain nodes 145 are each included on one of a plurality of computing devices 140, communicatively coupled via a network 135 that is external to the vehicle 105. The nodes included in the second blockchain network 112 are listed in the second blockchain 202.

Event data and update data can be stored as respective data blocks in the first blockchain 201 and the second blockchain 202. The first and second blockchains 201, 202, as discussed herein, are distributed databases including blockchains storing one or more data blocks identifying event data and update data, respectively. "Distributed" in this context means that copies of the database are maintained by multiple nodes in the plurality of first and second blockchain nodes, respectively. The data blocks stored within the blockchain are linked in a chain by hash functions that validate a link between respective blocks.

A blockchain 201, 202 is an electronic ledger maintained in each of a plurality of distributed nodes 127, 145 that form a network 111, 112, each storing shared data based on generation of hashes for blocks of data. A hash in the present context is a one-way encryption of data, i.e., a result of executing a hash function, having a fixed number of bits. An example of hash encryption is SHA-256. The hashes, i.e., results of hash functions, provide links to blocks of data by identifying locations of the block of data in storage (digital memory), for example by use of an association table mapping hashes to respective storage locations. An association table provides a mechanism for associating the hash (which may also be referred to as a hash key) with an address specifying a physical storage device either in a vehicle or a stationary location. The hash for the block of data further provides a code to verify the data to which the hash links. Upon retrieving the block of data, a computer can recompute the hash of the block of data and compare the resulting hash with the hash providing the link. In the case that the recomputed hash matches the linking hash, the computer can determine that the block of data is unchanged. Conversely, a recomputed hash that does not match the linking hash indicates that the block of data or the hash has been changed, for example through corruption or tampering. The hash providing the link to a block of data may also be referred to as a key or a hash key. An example structure of a first blockchain 201 and a second blockchain are discussed below in reference to FIGS. 2A and 2B, respectively.

Figure 1A:
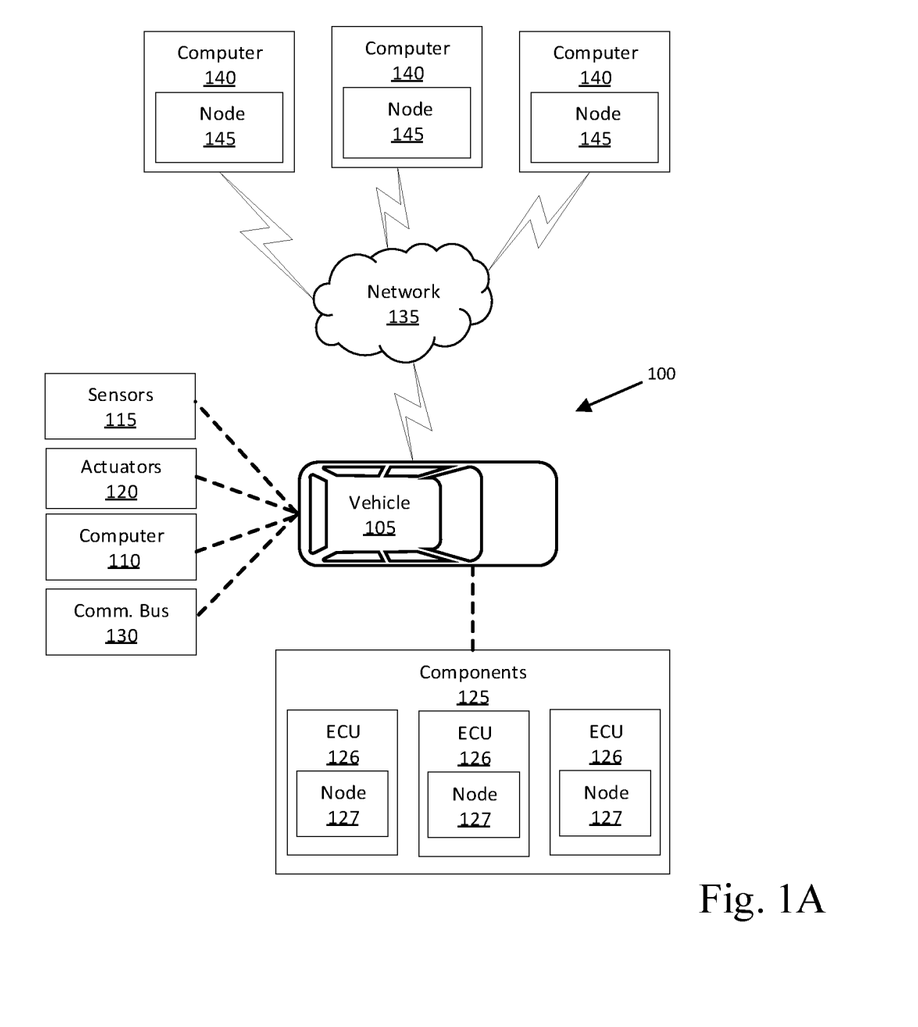
FIG. 1A is a block diagram illustrating an example system to authenticate and store event codes.

FIG. 1 is a block diagram of an example system 100 that includes a vehicle 105 having a plurality of first blockchain nodes 127 and a plurality of second blockchain nodes 145. That is, the vehicle 105 includes a plurality of ECUs 126 and each ECU 126 is programmed to maintain a first blockchain node 127 including a first blockchain 201.

Each ECU 126 is further programmed to store a detected event code in the first blockchain 201, and determine a validity of each first blockchain node 127 of the first blockchain 201 by determining that the event code is one of (a) stored in the respective first blockchain node 127 of the first blockchain 201 and therefore is valid or (b) not stored in respective first blockchain node 127 of the first blockchain 201 and therefore is invalid.

Each ECU 126 is further programmed to provide, via a network 135 outside the vehicle 105, the event code and the validity of each first blockchain node 127 of the first blockchain 201 to a second blockchain 202 maintained in at least one second blockchain node 145. Each ECU 126 receives, e.g., from one or more sensors 115, and stores various vehicle data, e.g., vehicle component 125 data, vehicle 105 operation data, etc. Advantageously, the ECUs 126 store sensor 115 data to the first blockchain 201 and provide the event code representing the sensor 115 data to the second blockchain 202, which can reduce the amount of data stored on the second blockchain 202 and can limit the data accessible by the second blockchain nodes 145 via the second blockchain 202.

The vehicle 105 includes a vehicle computer 110, sensors 115, actuators 120, vehicle components 125, and a vehicle communications bus 130. Via a network 135, the communications bus 130 allows the vehicle computer 110 to communicate with the one or more second blockchain nodes 145.

The vehicle computer 110 includes a processor and a memory such as are known. The memory includes one or more forms of computer-readable media, and stores instructions executable by the vehicle computer 110 for performing various operations, including as disclosed herein.

The vehicle computer 110 may operate the vehicle 105 in an autonomous, a semi-autonomous mode, or a non-autonomous (or manual) mode. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicles 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, etc., as well as to determine whether and when the vehicle computer 110, as opposed to a human operator, is to control such operations. Additionally, the vehicle computer 110 may be programmed to determine whether and when a human operator is to control such operations.

The vehicle computer 110 may include or be communicatively coupled to, e.g., via a vehicle communications network 130 such as a communications bus as described further below, more than one processor, e.g., included in electronic controller units (ECUs) 126 or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle communications network 130, the vehicle computer 110 may transmit messages to various devices in the vehicle 105 and/or receive messages (e.g., CAN messages) from the various devices, e.g., sensors 115, an actuator 120, ECUs 126, etc. Alternatively, or additionally, in cases where the vehicle computer 110 actually comprises a plurality of devices, the vehicle communication network 130 may be used for communications between devices represented as the vehicle computer 110 in this disclosure. Further, as mentioned below, various controllers and/or sensors 115 may provide data to the vehicle computer 110 via the vehicle communication network 130.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles 105, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that can be represented by physical phenomena (e.g., light or other electromagnetic waves, or sound, etc.) detectable by sensors 115. Thus, vehicles 105, as well as other items including as discussed below, fall within the definition of "object" herein.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components, including the ECUs 126, adapted to perform a mechanical or electromechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a brake component (as described below), a park assist component, an adaptive cruise control component, an adaptive steering component, a movable seat, etc.

The vehicle 105 can include any suitable number of, e.g., one or more, ECUs 126. Each of the ECUs 126 may transmit messages to and/or receive messages from each other and/or the vehicle computer 110 via the vehicle communications network 130. Each ECU 126 includes an identifier. In this context, an "identifier" is an alphanumeric string of data corresponding to a specific ECU 126. In other words, the identifier identifies a specific ECU 126.

The ECUs 126 are microprocessor-based computers. The ECUs 126 each include a processor, memory, etc. The memory of each ECU 126 includes media for storing instructions executable by the respective processor as well as for electronically storing data and/or databases. Non-limiting examples of ECUs 126 include a body control module, an antilock brake control module, a power-steering control module, an engine control module, a restraint control module, a powertrain control module, a battery-electronics control module, etc.

In addition, the vehicle computer 110 may be configured for communicating via a vehicle-to-vehicle communication bus 130 or interface with devices outside of the vehicle 105, e.g., via the network 135 and/or through vehicle-to-vehicle (V2V) or vehicle-to-infrastructure (V2X) wireless communications to another vehicle, and/or to the blockchain nodes 145 (typically via direct radio frequency communications). The communications bus 130 could include one or more mechanisms by which the computers 110 of vehicles 105 may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications bus 130 include cellular, Bluetooth, IEEE 802.11, dedicated short range communications (DSRC), and/or wide area networks (WAN), including the Internet, providing data communication services.

The network 135 represents one or more mechanisms by which the ECUs 126 and/or a vehicle computer 110 may communicate with remote devices, including devices 140 hosting the second blockchain nodes 145. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

Figure 1B:
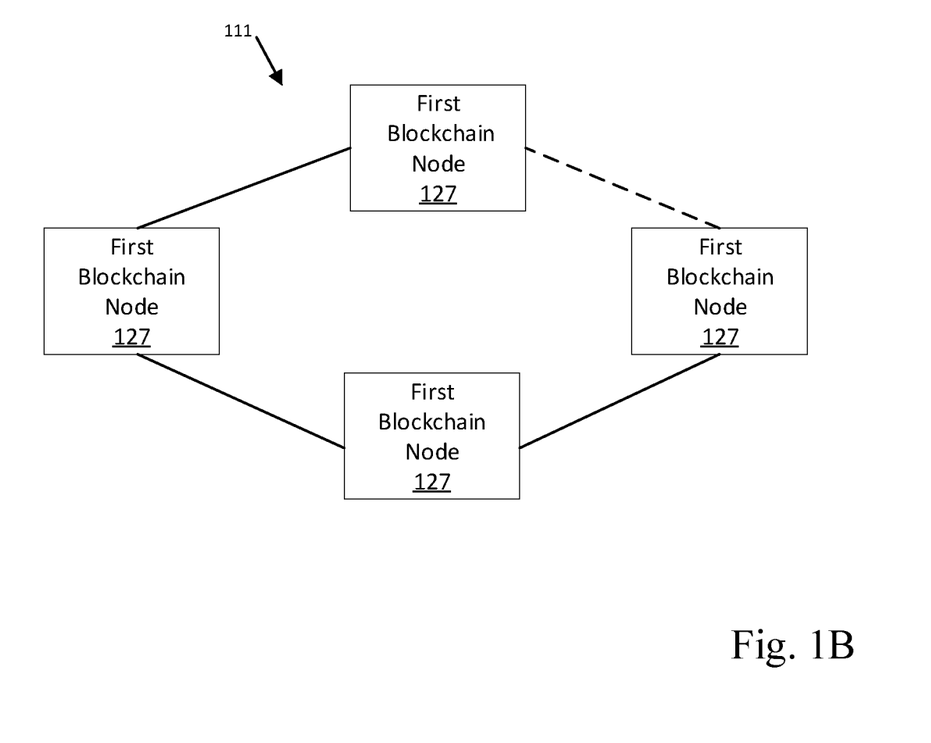
FIG. 1B is a block diagram illustrating an example first blockchain network.

The first blockchain network 111 (as shown in FIG. 1B) includes the plurality of first blockchain nodes 127, i.e., in a peer-to-peer network, with each node 127 in the peer-to-peer network including links to other nodes 127 in the network 111. Nodes 127 in the network 111 may be specified by the vehicle 105 manufacturer and may be recorded in the first blockchain 201.

The first blockchain 201 is a distributed blockchain ledger. That is, each node 127 stores, e.g., in a memory, one copy of the first blockchain 201. The nodes 127 may, for example, receive data blocks from other nodes in the plurality of first blockchain nodes 127 and may upload the data blocks to the first blockchain 201, i.e., store the respective data blocks in respective storage locations in the first blockchain 201 such that each data block is linked to one respective previous data block. Each data block may specify event data and/or sensor data for one ECU 126. The data blocks may be generated based on requests, which may be submitted, for example, by the ECU 126 that determines an event code over a CAN bus in the vehicle communications network 130. Each node 127 can compare its stored blockchain 201 data, i.e., linked data blocks, to versions of the blockchain 201 stored by other first blockchain nodes 127 to verify the data blocks, as described below.

In this context, event data is data indicating an event code, the identifier of the ECU 126 associated with the event code, and the validity of each first blockchain node 127 of the first blockchain 201, e.g., the identifiers for each authorized ECU 126 (as described below) and the identifiers for each unauthorized ECU 126 (as described below).

An "event code" is a set of data, typically an alphanumeric string, that specifies a predetermined event including damage to the vehicle 105. The events may be determined based on empirical testing to determine events that affect performance and/or a state of repair of the vehicle 105. Additionally, or alternatively, the events may be determined by a manufacturer's or designer's determination of events that may be material, e.g., to the performance of one or more vehicle components 125. The first character of the string of data can be an integer indicating a number of instances of predetermined events. The following one or more characters can be alphabetical characters indicating a type of event such as damage, e.g., collision, flood, fire, etc. Each event code is determined by one respective ECU 126, as discussed below. That is, each event code is associated with one and only one ECU 126 in the first blockchain 201. Non-limiting examples of "events codes" are shown below in Table 1.

TABLE 1

| Number of Occurrences | Event Type | Event Code |
|---|---|---|
| Zero | None | 00 |
| One | Front Impact | 1F |
| Two | Side Impact | 2S |
| One | Flood | 1Flood |
| One | Fire | 1Fire |

The ECUs 126 are programmed to receive sensor 115 data from one or more sensors 115, e.g., via the vehicle network. Each ECU 126 can receive data from different sensors 115. For example, each ECU 126 may be programmed to control and/or monitor specific vehicle components 125 and/or subsystems. In these circumstances, each ECU 126 receives sensor 115 data about the respective vehicle components 125 and/or subsystems. The ECUs 126 can then determine damage to the vehicle, e.g., one or more vehicle components 125 and/or subsystems, based on the sensor 115 data.

As one example, the sensor 115 data can be image and/or video data. In such an example, one or more ECUs 126 can analyze the image and/or video data to identify damage to the vehicle from, e.g., a collision, a flood, a fire, etc.

As another example, one or more ECUs 126 can compare the sensor 115 data to respective thresholds. The thresholds specify normal operation of vehicle components 125 of the vehicle. In this context, "normal operation" means the vehicle components 125 are operating within predetermined settings based on operation of the vehicle 105 on conventional roads. The thresholds can be determined through empirical testing to determine operation of vehicle components 125 during normal operation of the vehicle. For example, the ECUs 126 can compare a vehicle deceleration to a deceleration threshold, e.g., stored in a memory of one or more ECUs 126. In the case that the vehicle deceleration is above the deceleration threshold, the ECUs 126 can determine the vehicle was in a collision.

As another example, the ECUs 126 can compare a cabin temperature to a temperature threshold, e.g., stored in a memory of one or more ECUs 126. In the case that the cabin temperature is above the threshold temperature, the ECUs 126 can determine the vehicle is on fire.

Additionally, the respective ECU 126 can determine an event code based on the received sensor 115 data, e.g., a detected damage type. For example, the respective ECU 126 can determine the event code from a look-up table, e.g., similar to Table 1 above, based on the damage type associated with the event code in the look-up table. The respective ECU 126 then stores the event code to the respective first blockchain node 127 of the first blockchain 201.

The ECU 126 that determines the event code is programmed to transmit the event code to the other ECUs 126. The other ECUs 126 then authenticate (or fail to authenticate) the transmission. To perform the authentication, the other ECUs 126 may be programmed to generate a respective hash code and transmit the respective hash code to the ECU 126 that transmitted the event code. The ECU 126 that transmitted the event code may encrypt the respective hash codes based on a digital key, e.g., stored in a memory of the ECU 126 that transmitted the event code, to generate a challenge code and transmit the encrypted hash code to the other ECUs 126. The other ECUs may then decrypt the encrypted hash code. In the case the decrypted hash code matches the challenge code, the other ECUs 126 will approve (authenticate) the transmission. Conversely, in the case that the decrypted hash code does not match the challenge code, the other ECUs 126 reject (fail to authenticate) the transmission.

Upon approving the transmission, the ECUs 126 are programmed to store the event code to the first blockchain 201. For example, each ECU 126 may be programmed to store event data and the sensor data to an event block of a first blockchain 201, as described below. The ECUs may store the event code to the first blockchain 201 before or after the first blockchain nodes 127 validate each other (as described below). For example, the ECUs may store the event code to the first blockchain 201, and then the first blockchain nodes 127 may validate each other based on the event code. As another example, the first blockchain nodes 127 may validate each other based on previously stored event codes, and then the ECUs may store the event code to the first blockchain 201, and in particular to the validated first blockchain nodes 127. Additionally, the ECUs 126 are programmed to transmit event data to at least one second blockchain node 145, e.g., via the network. The second blockchain node 145 can then store the event data to an event block of a second blockchain 202, as described below.

A first blockchain node 127 is a computing device in the plurality of first blockchain nodes 127 that stores one copy of the first blockchain 201. Each first blockchain node 127 is hosted on one respective ECU 126. The first blockchain nodes 127 can be accessed via the vehicle communications network 130.

The plurality of first blockchain nodes 127 maintains the first blockchain 201. The plurality of first blockchain nodes 127 are programmed to validate each first blockchain node 127 of the first blockchain 201. Each first blockchain node 127 is valid when the first blockchain node 127 stores the same event codes as at least one other first blockchain node 127. For example, the plurality of first blockchain nodes 127 can validate each first blockchain node 127 of the first blockchain 201 by comparing the event codes stored in the respective first blockchain nodes 127 of the first blockchain 201. In the case that the same event codes are stored in each first blockchain node 127 of the first blockchain 201, the plurality of first blockchain nodes 127 determine that each first blockchain node 127 of the first blockchain 201 is valid. In other words, each first blockchain node 127 that stores the event code is valid. Conversely, in the case that the same event codes are not stored in each first blockchain node 127 of the first blockchain 201, the plurality of first blockchain nodes 127 determine the first blockchain node 127 lacking the event code is invalid. In other words, each first blockchain node 127 lacking the event code is invalid.

Each ECU 126 that includes a valid first blockchain node 127 of the first blockchain 201 is authorized, and each ECU 126 that includes an invalid first blockchain node 127 of the first blockchain 201 is unauthorized. Authorized ECUs 126 are programmed to store data identifying unauthorized ECUs, e.g., in a memory of the respective ECU. For example, authorized ECUs 126 can store the identifier of unauthorized ECUs. Additionally, the ECUs 126 can provide the data identifying each authorized and/or unauthorized ECU, e.g., the identifier, to the second blockchain nodes 145, e.g., via the network 135. The ECUs 126 can provide data identifying the authorized and/or unauthorized ECUs to the second blockchain node 145 in a same or different transmission as the event data.

Figure 1C:
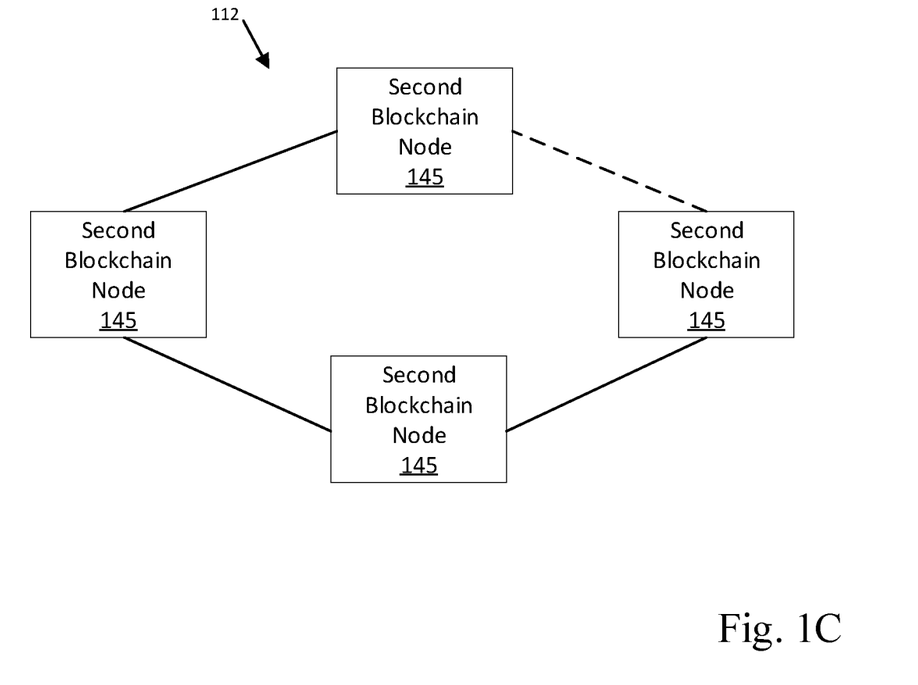
FIG. 1C is a block diagram illustrating an example second blockchain network.

The second blockchain network 112 (as shown in FIG. 1C) includes the plurality of second blockchain nodes 145, i.e., the plurality of second blockchain nodes 145 is a peer-to-peer network. Nodes in the plurality of second blockchain nodes 145 may be specified by the vehicle 105 manufacturer and may be recorded in the second blockchain 202.

The second blockchain 202 is a distributed blockchain ledger. That is, each second blockchain node 145 stores, e.g., in a memory, one copy of the second blockchain 202. The second blockchain nodes 145 may, for example, receive data blocks from other second blockchain nodes 145 and may upload the data blocks to their respective copies of the second blockchain 202, i.e., store the respective data blocks in respective storage locations in their respective second blockchains 202. A data block in the second blockchain 202 may represent event codes and update data for one ECU 126 and be generated based on a request from a second blockchain node 145. Each second blockchain node 145 can compare its stored blockchain data, i.e., linked data blocks, to blockchains stored by other second blockchain nodes 145 to verify the data blocks. For example, each second blockchain node 145 can generate a hash based on the data stored in a respective data block of a blockchain stored by another second blockchain node 145. In the case the hash generated by the one second blockchain node 145 matches the hash stored by the other second blockchain node 145 for the respective data block, the one second blockchain node 145 determines the data block is verified.

In this context, an "update code" is an integer, e.g., zero or higher. The update code specifies a number of times one respective ECU 126 has been replaced and/or modified. Specifically, the update code specifies a number of authorized ECU 126 modifications and/or replacements. A replacement and/or modification of the ECU 126 is authorized when performed by a second blockchain node 145 authenticated by the ECUs 126, as discussed below. Modified, in the present context, means the data in the memory of the respective ECU has been altered or removed.

Figure 2A:
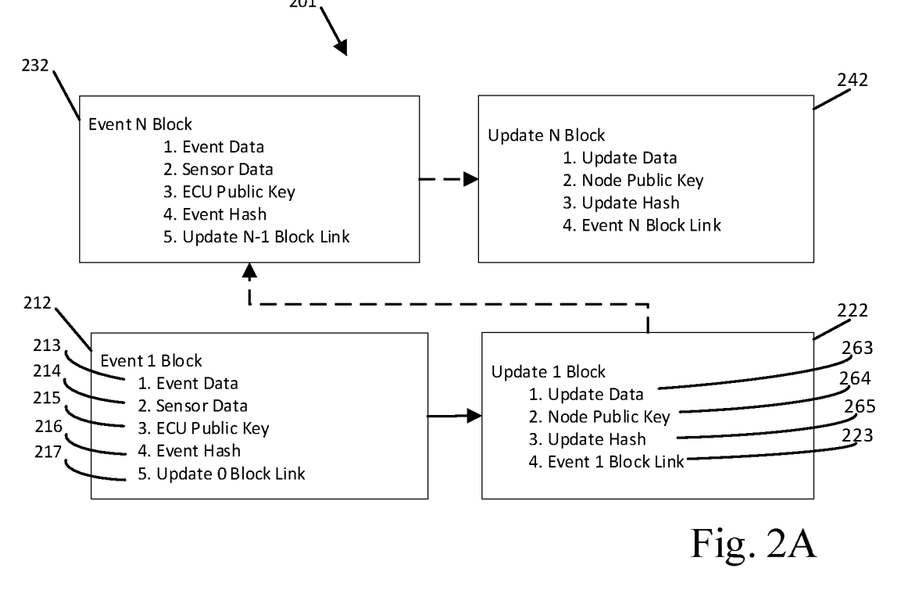
FIG. 2A is a diagram of a portion of an example first blockchain.
Figure 2B:
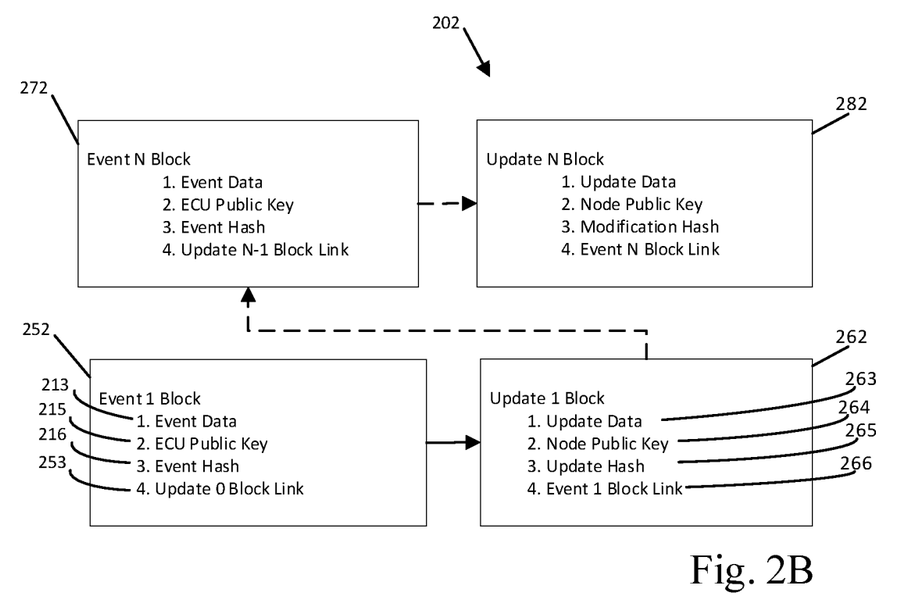
FIG. 2B is a diagram of a portion of an example second blockchain.

The update code and the event code may be stored as a single data string in the first and second blockchains 201, 202. For example, the first and second blockchain nodes 127, 145 may combine, i.e., concatenate, the update code and the event code together and store the combination in the respective blockchains 201, 202. When combined, the update code may be stored adjacent to the last character of the event code. Non-limiting examples of the combined data string include, e.g., "000", "1F0", "1Flood1", "2S1", etc. (as continued from the example in Table 1 above), in which the last character of the respective string is the update code.

A second blockchain node 145 is a computing device in the plurality of second blockchain nodes 145 that stores one copy of the second blockchain 202. Each second blockchain node 145 is hosted on a conventional computing device 140, i.e., including one or more processors and one or more memories, programmed to provide operations such as described herein. The second blockchain nodes 145 can be accessed via the communications network 135. The computing device 140 hosting each respective second blockchain node 145 may be associated with an entity that participates in maintaining the second blockchain 202, e.g., to verify data in the second blockchain 202, to store data on the second blockchain 202, etc. For example, a second blockchain node 145 may be hosted on a computer associated with a manufacturer of vehicles, a computer associated with an automotive supplier which manufactures vehicle components 125, etc. Each second blockchain node 145 includes an identifier. In this context, an "identifier" is an alphanumeric string of data corresponding to a specific second blockchain node 145. In other words, the identifier identifies a specific second blockchain node 145.

The plurality of second blockchain nodes 145 maintains the second blockchain 202. That is, the plurality of second blockchain nodes 145 may receive requests from time-to-time to add a node to the plurality of second blockchain nodes 145. The node may be, for example, an external node from a supplier of an ECU 126 or a distributer of vehicles 105 such as a dealership. The nodes in the plurality of second blockchain nodes 145 evaluate the request. In the case the request is approved, e.g., via a consensus protocol (i.e., a majority of the second blockchain nodes 145 determine the request is approved), the plurality of second blockchain nodes 145 adds the node to the plurality of second blockchain nodes 145 and adds a data block to the second blockchain 202 recording the addition.

Additionally, or alternatively, the second blockchain nodes 145 may receive an update code, e.g., from a user input. The update code, as stated above, specifies a number of updates, e.g., replacements or modification, of an ECU 126. For example, during vehicle maintenance, a user may input to the second blockchain node 145, e.g., maintained by a repair entity, that the user either removed one ECU 126 of the vehicle 105 and replaced the one ECU 126 with another ECU or modified data in the memory, e.g., cleared or erased the data stored in the memory, of the one ECU 126. In this situation, the second blockchain node 145 is programmed to increase the update code by a value of 1, e.g., from 0 to 1, from 1 to 2, etc. The nodes of the plurality of second blockchain nodes 145 evaluate the update code. In the case that the update code is approved, e.g., via a consensus protocol (i.e., a majority of the second blockchain nodes 145 determine the update code is approved), the plurality of second blockchain nodes 145 adds a data block to the second blockchain 202 recording the authorization. Upon storing the update code to the second blockchain 202, the second blockchain node 145 is programmed to transmit the update code to the ECUs 126, e.g., via the network 135. The ECUs 126 may be programmed to generate a respective hash code and transmit the respective hash code to the second blockchain node 145. The second blockchain node 145 may encrypt the respective hash codes based on a digital key to generate a challenge code and transmit the encrypted hash code to the ECUs 126. The ECUs 126 may then decrypt the encrypted hash code. In the case the decrypted hash code matches the challenge code, the ECUs 126 determine that the second blockchain node 145 is authorized. Upon determining that the second blockchain node 145 is authorized, the ECUs 126 can store the update code to the respective first blockchain nodes 127 of the first blockchain 201.

FIG. 2A illustrates a portion of a first blockchain 201 for the vehicle as stored by one first blockchain node 127 in a first blockchain network 111. The first blockchain 201 is a blockchain ledger that stores event data and update data. The first blockchain 201 includes event blocks 212, 232, and update blocks 222, 242.

Upon determining the ECU 126 determining an event code, the respective first blockchain node 127 is programmed to initiate creation of an event block 212 in the first blockchain 201. An event block 212 is a blockchain data block that stores event data (as described above) and typically also sensor 115 data received by the ECU 126 that determines the event code. The first blockchain node 127 stores the event data and the sensor 115 data to the event block 212 in the first blockchain 201. For example, the first blockchain node 127 can store one copy of the event data and the sensor 115 data in the memory of the respective ECU 126 and another copy of the event data and the sensor 115 data to the respective event block 212. Alternatively, the first blockchain node 127 can generate one or more links, explained further below, to access the event data and the sensor 115 data. Each ECU 126 can then store the link to the respective event block 212.

A link in this context is an address to respective event data and/or sensor 115 data that is stored in a location external to the event block 212. The link identifies a storage location or address of the respective event data and/or sensor 115 data, e.g., a memory of the respective ECU 126, a memory of a vehicle computer 110, etc., and further provides a code for verifying the respective event data and/or sensor 115 data. The code of the link may be a hash of the data to which it provides a link. the first blockchain node 127 may generate one or more link. For example, the first blockchain node 127 may generate an event data link 213 and a sensor data link 214. In such an example, the event data link 213 identifies a storage location of the event data and the sensor data link 214 identifies a storage location of the sensor 115 data. Alternatively, the first blockchain node 127 may generate a common link for the event data and the sensor 115 data, e.g., that identifies a common storage location of the event data and the sensor 115 data.

The first blockchain node 127 can store an ECU Public Key, e.g., in a memory of the respective ECU 126. In these circumstances, the first blockchain node 127 can generate an ECU Public Key link 215 and can store the ECU Public Key link 215 to the event block 212. The ECU Public Key is a digital key that can be used to authenticate transmissions from the ECU 126. For example, the other ECUs 126 may use the ECU Public Key of one ECU 126 to decrypt messages from the respective ECU 126, as described above. The ECU Public Key link 215 is a link that identifies the storage location or address of the ECU Public Key and further provides a code for verifying the ECU Public Key. The code of the ECU Public Key link 215 may be a hash of the ECU Public Key. Alternatively, the first blockchain node 127 can store the ECU Public Key to the event block 212.

The first blockchain node 127 can generate an event hash 216 and an update block link 217 and store the event hash 216 and the update block link 217 to the event block. The update block link 217 is a blockchain link from one blockchain data block to the most recent previous blockchain data block. In these circumstances, the update block link 217 is a link between the event block 213 and the most recent previous update block 222. The update block link 217 is a hash of data store in the most recent previous update block 222. The "event 1" block 212 is an initial block in the first blockchain 201, and therefore, the update block link 217 stored in the "event 1" block 212 is null (i.e., no data).

The event hash 216 is an identifier of one blockchain data block, in the present example, the event block 212. The event hash 216 further in this example is a hash of the data stored in the event block 212. For example, the event hash 216 may be a hash of the event data, the sensor 115 data, and the update block link 217. Alternatively, the event hash 216 may be a hash of the event data link 213, the sensor data link 214, and the update block link 217.

The first blockchain node 127 transmits the event block 212 to the other first blockchain nodes 127, and the other first blockchain nodes 127 validate the transmission, as described above. Upon validating the transmission, the first blockchain nodes 127 store the event block 212 to the first blockchain 201. The ECUs 126 then transmit the event data to the second blockchain nodes 145, e.g., via the network 135. Upon receiving the event data, the second blockchain nodes 145 can validate the event data according to the authorized ECUs 126. That is, the second blockchain node 145 can validate the event data received from authorized ECUs and can invalidate the event data received unauthorized ECUs.

Upon authorizing the second blockchain node 145, the first blockchain nodes 127 are programmed to initiate creation of an update block 222 in the first blockchain 201. An update block is a blockchain data block that stores update data, as described below. The first blockchain nodes 127 store the update data to the update block 222 in the first blockchain 201. For example, the first blockchain nodes 127 can store one copy of the update data in the memory of the respective ECU 126 and another copy of the update data to the update block 222. Alternatively, the first blockchain nodes 127 can generate one or more links, as explained above, to access the update data. The first blockchain nodes 127 can then store the link to the update block 222.

The first blockchain nodes 127 can store an update data link 263 (as described below), a Node Public Key link 264 (as described below), and an update hash 265 (as described below) to the update data block 222.

The first blockchain nodes 127 can generate an event block link 223 and stores the event block link 223 to the update block 222. The event block link 223 is a blockchain link from one blockchain data block to the most recent previous blockchain data block. In these circumstances, the event block link 223 is a link between the update block 222 and the most recent previous event block 212. The event block link 223 is a hash of data stored in the most recent previous event block 212.

FIG. 2B illustrates a portion of a second blockchain 202 for the vehicle 105 as stored by one second blockchain node 145 in a second blockchain network 112. The second blockchain 202 is a blockchain ledger that stores event data and update data. The second blockchain 202 includes event blocks 252, 272 and update blocks 262, 282.

Upon receiving the event data from the authorized ECUs 126, the second blockchain node 145 is programmed to initiate creation of an event block 252 in the second blockchain node 145 of the second blockchain 202. An event block is a blockchain data block that stores event data (as described above). The second blockchain node 145 stores the event data to the event block 252 in the second blockchain 202. For example, second blockchain node 145 can store one copy of the event data in the memory of the computer hosting the second blockchain node 145 and another copy of the event data to the respective event block 252. Alternatively, the second blockchain node 145 can generate one or more links, as explained above, to access the event data. The second blockchain node 145 can then store the link to the respective event block 252.

The second blockchain node 145 can store the event data link 213 (as described above) and the ECU Public Key link 215 (as described above). The event block 252 lacks the sensor data link 224.

The second blockchain node 145 can generate an update block link 253 and an event hash 254 and stores the update block link 253 and the event hash 254 to the event block 252. The event block link 253 is a blockchain link from one blockchain data block to the most recent previous blockchain data block. In these circumstances, the event block link 253 is a link between the event block 252 and the most recent previous update block. The event block link 253 is a hash of data stored in the most recent previous update block. The "event 1" block 252 is an initial block in the second blockchain ledger 202, and therefore, the update block link 253 stored in the "event 1" block 252 is null (i.e., no data).

The event hash 254 is an identifier of one blockchain data block, in the present example, the event block 252. The event hash 254 further in this example is a hash of the data stored in the event block 252. For example, the event hash 254 may be a hash of the event data, the ECU Public Key, and the update block link 217. Alternatively, the event hash 216 may be a hash of the event data link 213, the ECU Public Key link 215, and the update block link 217.

Upon determining an update code, the second blockchain node 145 is programmed to initiate creation of the update block 262. An update block is a blockchain data block that stores update data. Update data is data indicating the update code and the identifier for the second blockchain node 145. The second blockchain node 145 can store the update data to the update block 262. For example, the second blockchain node 145 can store one copy of the update data in a memory of the computer hosting the second blockchain node 145 and another copy of update data to the update block 262. Alternatively, the second blockchain node 145 can generate one or more links, explained further below, to access the update data. The second blockchain node 145 can store the links to the update block 262.

A link in this context is an address to respective update data that is stored in a location external to the update block. The link identifies a storage location of the update data, e.g., a memory of a computer hosting a second blockchain node 145, a memory of a vehicle computer, etc., and further provides a code for verifying the update data. The code of the link may be a hash of the data to which it provides a link. For example, the second blockchain node 145 may generate an update data link 263, e.g., that identifies a common storage location of the update code and the identifier for the second blockchain node 145. Alternatively, the second blockchain node 145 may generate substantially unique update links for the update code and the identifier for the second blockchain node 145.

The second blockchain node 145 can store a Node Public Key, e.g., in a memory of the computer hosting the second blockchain node 145. In these circumstances, the second blockchain node 145 can generate a Node Public Key link 264 and can store the Node Public Key link 264 to the update block. The Node Public Key may be a digital key that can validate the second blockchain node 145. For example, the ECUs 126 may use the Node Public Key to decrypt messages from the second blockchain node 145, as described above. The Node Public Key link 264 is a link that identifies the storage location or address of the Node Public Key and further provides a code for verifying the Node Public Key. The code of the Node Public Key link 264 may be a hash of the Node Public Key. Alternatively, the second blockchain node 145 can store the Node Public Key to the update block 262.

The second blockchain node 145 can generate an update hash 265 and an event block link 266 and stores the update hash and the event block link 266 to the update block 262. The event block link 266 is a blockchain link from one blockchain data block to the most recent previous blockchain data block. In these circumstances, the event block link 266 is a link between the update block 262 and the most recent previous event block 252. The event block link 266 is a hash of data stored in the most recent previous event block 252.

The update hash 265 is an identifier of one blockchain data block, in the present example, the update block 262. The update hash 265 further in this example is a hash of the data stored in the update block 262. For example, the update hash 265 may be a hash of the update code, the identifier for the blockchain node 145, and the event block link 266. As another example, the update hash 265 may be a hash of the update data link 263 and the event block link 266.

The second blockchain node 145 stores the update blocks 262 to the second blockchain 202. The second blockchain node 145 then transmits the update data to the ECUs 126, e.g., via the network. The ECUs 126 authorize the second blockchain node 145, as described above. Upon the ECUs 126 authorizing the second blockchain node 145, the first blockchain nodes 127 store the update data to the first blockchain 201, as described above.

Figure 3:
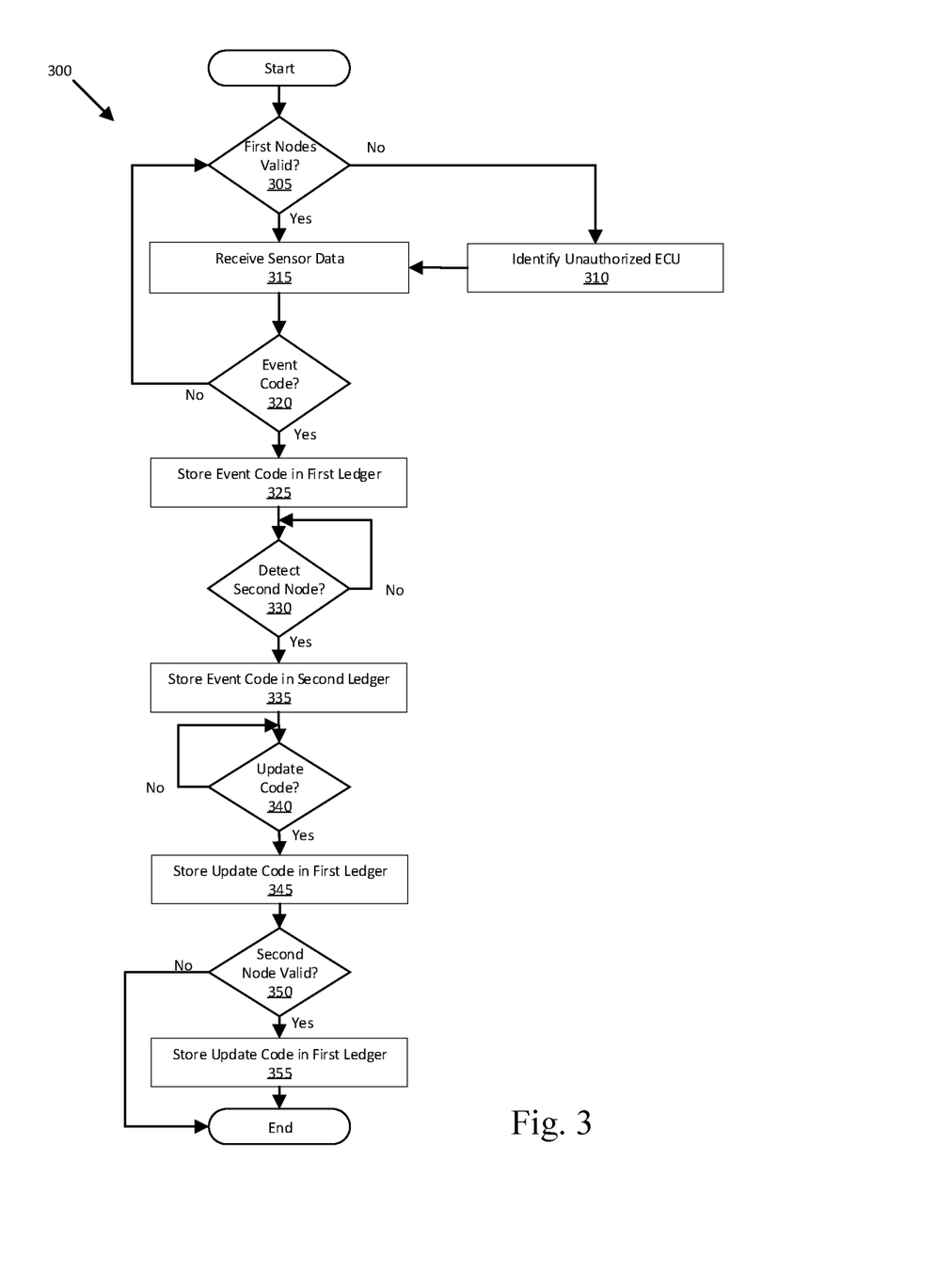
FIG. 3 is a flowchart of an example process for updating the first and second blockchains.

FIG. 3 illustrates an example process 300 for updating the first and second blockchains 201, 202. The process starts in a block 305.

In the block 305, the first blockchain nodes 127 determine each other's respective validities. For example, the first blockchain nodes 127 can compare the event codes stored in each first blockchain node 127 of the first blockchain 201. In the case the events codes are the same in each first blockchain node 127 of the first blockchain 201, the first blockchain nodes 127 determine each first blockchain node 127 is valid. In the case the event codes are not the same in each first blockchain node 127 of the first blockchain 201, the first blockchain nodes 127 determine at least one first blockchain node 127 is invalid. In these circumstances, the first blockchain nodes 127 determine that the first blockchain node 127 that lacks the event code is invalid. The first blockchain nodes 127 determine the validities via a consensus protocol, i.e., a majority of the first blockchain nodes 127 determines the validity of the respective first blockchain node 127. In the case each first blockchain node 127 is valid, the process 300 continues in a block 315. In the case that at least one first blockchain node 127 is invalid, the process 300 continues in a block 310.

In the block 310, the ECUs 126 identify the one or more unauthorized ECUs. An ECU is unauthorized when the ECU includes an invalid first blockchain node 127, i.e., a first blockchain node 127 of the ECU lacks the event code. In these circumstances, the authorized ECUs, i.e., the ECUs that include first blockchain nodes 127 storing the event code, store the identifier of the unauthorized ECUs, e.g., in a respective memory. The process 300 continues in the block 315.

In the block 315, the ECUs 126 receive sensor 115 data. Each ECU 126 receives sensor 115 data from one or more sensors 115, e.g., via the vehicle network. The ECUs 126 may receive data from the same or different sensors. The process 300 continues in the block 320.

In the block 320, in response to receiving the sensor 115 data, the ECUs 126 determine an event code. For example, the ECUs 126 can analyze the sensor 115 data to determine the event code. Each ECU 126 can, for example, determine the event code based on Table 1, as shown above. In the case one ECU 126 determines an event code, the one ECU 126 transmits the event code to the other ECUs 126, and the process 300 continues in a block 325. Otherwise, the process 300 returns to the block 305.

In the block 325, the ECUs 126 store the event code in the first blockchain 201. For example, the first blockchain nodes 127 generate an event N block 232 to store event N data and sensor N data in the respective first blockchain node 127 of the first blockchain 201. N is an integer having a value of 1 or greater. An event N block 232 is a current and Nth event block for which data is being stored in the first blockchain 201. Event N data and sensor N data is data substantially uniquely identifying the Nth event. The event N data and the sensor N data may be stored in a location external to the event N block 232, e.g., in a memory of the vehicle computer 110, a central server, etc. In this situation, the first blockchain nodes 127 may generate an event data link 213, a sensor data link 214, and an ECU Public Key link 215 that link to the respective data. In this situation, the first blockchain nodes 127 stores the links 213, 214, 215 in the event N block 232. Alternatively, the first blockchain nodes 127 may store the event N data and the sensor N data in the event N block 232.

Additionally, the first blockchain nodes 127 generates an update N−1 block link 217 and an event hash 216. The first blockchain nodes 127 then store the update N−1 block link 217 and the event hash 216 to the event N block 232. process 300 ends after the block 350. The process 300 continues in a block 330.

In the block 330, the ECUs 126 determine whether a second blockchain node 145 is detected. For example, the ECUs 126 can detect the second blockchain node 145 based on receiving a message from the second blockchain node 145, e.g., via the network 135. The ECUs 126 can then transmit the event data to the second blockchain node 145. Additionally, the ECUs 126 can transmit the identifier of the unauthorized ECUs, if any, to the second blockchain node 145, e.g., in a same or different transmission. In the case the ECUs 126 detect the second blockchain node 145, the process 300 continues in a block 335. Otherwise, the process 300 remains in the block 330.

In the block 335, upon receiving the event data from the ECUs 126, the second blockchain node 145 can store the event data to the second blockchain 202. For example, the second blockchain node 145 generate an event N block 272 to store the event data in the second blockchain 202. N is an integer 1 or greater. An event N block 272 is a current and Nth event block for which data is being stored in the second blockchain 202. Event N data is data substantially uniquely identifying the Nth event. The event N data may be stored in a location external to the event N block 272, e.g., in a memory of the vehicle computer 110, a central server, a memory of the second blockchain node 145, etc. In this situation, the second blockchain node 145 may generate the event data link 213 and the ECU Public Key link 215 that link to the respective data. In this situation, the second blockchain node 145 stores the links 213, 215 in the event N block 272. Alternatively, the second blockchain node 145 may store the event N data in the event N block 272.

Additionally, the second blockchain node 145 generates an update N−1 block link 253 and the event hash 254. The second blockchain node 145 then stores the update N−1 block link 253 and the event hash 254 to the event N block 272. The process 300 continues in a block 340.

In the block 340, the second blockchain node 145 can determine an update code. For example, the second blockchain node 145 can receive user input indicating an update to at least one ECU 126. For example, one ECU 126 can be replaced with a different ECU. As another example, the data in the memory of one ECU 126 can be erased or altered. In the case the second blockchain node 145 receives input indicating an update to at least one ECU 126, the second blockchain node 145 generates the update code, and the process 300 continues in a block 345. Otherwise, the process 300 remains in the block 340.

In the block 345, upon determining the update code, the second blockchain node 145 stores the update code to the second blockchain node 145 of the second blockchain 202. For example, the second blockchain node 145 generate an update N block 282 to store the update code in the second blockchain 202. N is an integer 1 or greater. An update N block 282 is a current and Nth update block for which data is being stored in the second blockchain 202. Update N data is data substantially uniquely identifying the Nth update. The update N data may be stored in a location external to the update N block 282, e.g., in a memory of the vehicle computer 110, a central server, a memory of the second blockchain node 145, etc. In this situation, the second blockchain node 145 may generate an update data link 263 and a Node Public Key link 264 that link to the respective data. In this situation, the second blockchain node 145 stores the links 263, 264 in the update N block 282. Alternatively, the second blockchain node 145 may store the update N data in the update N block 282.

Additionally, the second blockchain node 145 generates an event N−1 block link 266 and an update hash 265. The second blockchain node 145 then store the event N−1 block link 266 and the update hash 265 to the update N block 282. The second blockchain node 145 can then transmit the update data and the node public key to the ECUs 126, and the process 300 continues in a block 350.

In the block 350, the ECUs 126 determine whether the second blockchain node 145 is valid. For example, the ECUs 126 may generate and transmit a challenge hash to the second blockchain node 145. The second blockchain node 145 then responds to the ECUs 126. For example, the second blockchain node 145 may encrypt, e.g., based on a first digital key, the challenge hash received from the ECUs 126 and/or may encrypt the identifier of the second blockchain node 145 and may transmit the encrypted challenge hash and/or encrypted identifier of the second blockchain node 145 to the ECUs 126.

The ECUs 126 then decrypts, e.g., based on a second digital key, the encrypted challenge hash and encrypted identifier of the second blockchain node 145. In the case that the second blockchain node 145 is an authorized second blockchain node 145 for the vehicle 105, the first digital key and second digital key may correspond such that data encrypted by the first digital key can be decrypted and recovered with the second digital key. The ECUs 126 then compare the decrypted hash to the challenge hash. In the case that the decrypted hash matches the challenge hash, the ECUs 126 determine that the second blockchain node 145 is an authorized second blockchain node 145. Alternatively, or additionally, the ECUs 126 may compare the decrypted identifier for the second blockchain node 145 with a list of authorized identifiers, and, upon identifying a match, determine that the second blockchain node 145 is an authorized second blockchain node 145. In the case that the ECUs 126 determine that the second blockchain node 145 is an authorized second blockchain node 145, the process 300 continues in a block 355. Otherwise, the process 300 ends.

In the block 355, upon the ECUs 126 validating the second blockchain node 145, the first blockchain nodes 127 store the update data in the first blockchain 201. For example, the first blockchain nodes 127 generate an update N block 242 to store the data in the respective first blockchain node 127 of the first blockchain 201. N is an integer 1 or greater. An update N block 242 is a current and Nth update block for which data is being stored in the first blockchain 201. Update N data is data uniquely identifying the Nth update. The update N data may be stored in a location external to the update N block 242, e.g., in a memory of the vehicle computer 110, a central server, etc. In this situation, the first blockchain nodes 127 may generate the update data link 263 and the Node Public Key link 264 that link to the respective data. In this situation, the first blockchain nodes 127 stores the links 263, 264 in the update N block 242. Alternatively, the first blockchain nodes 127 may store the update N data in the update N block 242.

Additionally, the first blockchain nodes 127 generates an event N−1 block link 223 and the update hash 265. The first blockchain nodes 127 then store the event N−1 block link 223 and the update hash 265 to the update N block 242. The process 300 ends after the block 350.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A method comprising:
    storing a detected event code in a first blockchain, wherein each electronic control unit (ECU) in a plurality of ECUs in a vehicle includes a first blockchain node of the first blockchain, and the event code is received in a selected one of the ECUs based on sensor data;
    determining a validity of each first blockchain node of the first blockchain by determining that the event code is one of (a) stored in the respective first blockchain node of the first blockchain stored in each of the ECUs in the vehicle, and valid or (b) not stored in the respective first blockchain node of the first blockchain stored in each of the ECUs in the vehicle, and invalid;
    providing the event code and the validity of each first blockchain node of the first blockchain to a second blockchain maintained in at least one second blockchain node via a network outside the vehicle; and
    upon receiving an update code from at least one second blockchain node via the network, store the update code in the first blockchain, the update code specifying a number of times the selected one of the ECUs has been authorized to be modified or replaced.

2. The method of claim 1, wherein determining the validity of each first blockchain node of the first blockchain is performed upon determining that the detected event code identifies damage to the vehicle.

3. The method of claim 1, further comprising identifying an unauthorized ECU in the plurality of ECUs based on the respective first blockchain node being invalid.

4. The method of claim 3, further comprising providing data identifying the unauthorized ECU to the second blockchain.

5. The method of claim 1, further comprising authenticating the second blockchain node based on an identifier matching an authorized identifier.

6. The method of claim 1, further comprising validating the update code by at least one ECU decrypting the update code with a digital key.

7. The method of claim 1, wherein each event code is associated in the first blockchain with one and only one of the ECUs.

8. The method of claim 1, further comprising determining the detected event code based on sensor data of the vehicle.

9. The method of claim 1, further comprising, upon detecting the event code, validating the event code by at least one ECU decrypting the event code with a digital key.

10. A system, comprising:
    a plurality of electronic control units (ECUs) in a vehicle, each ECU having a processor and a memory, the memory of each ECU storing instructions executable by the processor of each ECU such that each processor is programmed to:
    store a detected event code in a first blockchain, wherein each of the ECUs in the plurality of ECUs includes a first blockchain node of the first blockchain, and the event code is received in a selected one of the ECUs based on sensor data;
    determine a validity of each first blockchain node of the first blockchain by determining that the event code is one of (a) stored in the respective first blockchain node of the first blockchain stored in each of the ECUs in the vehicle, and valid or (b) not stored in the respective first blockchain node of the first blockchain stored in each of the ECUs in the vehicle, and invalid;
    provide the event code and the validity of each first blockchain node of the first blockchain to a second blockchain maintained in at least one second blockchain node via a network outside the vehicle; and
    upon receiving an update code from at least one second blockchain node via the network, store the update code in the first blockchain, the update code specifying a number of times the selected one of the ECUs has been authorized to be modified or replaced.

11. The system of claim 10, wherein determining the validity of each first blockchain node of the first blockchain is performed upon determining that the detected event code identifies damage to the vehicle.

12. The system of claim 10, wherein the instructions further include instructions to identify an unauthorized ECU in the plurality of ECUs based on the respective first blockchain node being invalid.

13. The system of claim 12, wherein the instructions further include instructions to provide data identifying the unauthorized ECU to the second blockchain.

14. The system of claim 10, wherein the instructions further include instructions to authenticate the second blockchain node based on an identifier matching an authorized identifier.

15. The system of claim 10, wherein the instructions further include instructions to validate the update code by at least one ECU decrypting the update code with a digital key.

16. The system of claim 10, wherein each event code is associated in the first blockchain with one and only one of the ECUs.

17. The system of claim 10, wherein the instructions further include instructions to determine the detected event code based on sensor data of the vehicle.

18. The system of claim 10, wherein the instructions further include instructions to, upon detecting the event code, validate the event code by at least one ECU decrypting the event code with a digital key.

* * * * *